US012791143B2

(12) United States Patent
Price et al.

(10) Patent No.: US 12,791,143 B2
(45) Date of Patent: Nov. 10, 2026

(54) DEVICE MOUNT

(71) Applicant: BeatDown Outdoor Products, LLC, Sedalia, MO (US)

(72) Inventors: Todd Price, Sedalia, MO (US); Blake Price, Sedalia, MO (US)

(73) Assignee: BeatDown Outdoor Products, LLC, Sedalia, MO (US)

( * ) Notice: Subject to any disclaimer, the term of this patent is extended or adjusted under 35 U.S.C. 154(b) by 514 days.

(21) Appl. No.: 18/124,938

(22) Filed: Mar. 22, 2023

(65) Prior Publication Data

US 2024/0318773 A1 Sep. 26, 2024

(51) Int. Cl.

*F16M 11/12* (2006.01)
*B63B 17/00* (2006.01)
*F16M 11/20* (2006.01)

(52) U.S. Cl.

CPC ......... *F16M 11/2085* (2013.01); *F16M 11/12* (2013.01); *B63B 2017/0054* (2013.01); *F16M 2200/027* (2013.01)

(58) Field of Classification Search

CPC .... F16M 13/022; F16M 11/045; F16M 11/12; F16M 11/2085; F16M 11/22; F16M 2200/02; F16M 2200/025; F16M 2200/027; B63B 2017/0054

USPC ..... 114/364; 248/229.2, 230.6, 279.1, 287.1, 248/298.1

See application file for complete search history.

(56) References Cited

U.S. PATENT DOCUMENTS

| | | | | | |
|---|---|---|---|---|---|
| 4,527,349 | A * | 7/1985 | Emory, Jr. | A01K 97/10 248/513 |
| 6,454,228 | B1 * | 9/2002 | Bosnakovic | F16M 11/245 248/169 |
| 9,174,587 | B2 * | 11/2015 | Fan | B60R 11/02 |
| 9,656,394 | B2 * | 5/2017 | Lin | B25J 15/0408 |
| 10,011,022 | B1 * | 7/2018 | Lin | B25J 15/0061 |
| 10,337,664 | B2 * | 7/2019 | Migliori | F16M 11/14 |
| 11,021,215 | B1 * | 6/2021 | Price | B63B 17/00 |
| 11,213,957 | B2 * | 1/2022 | Lin | B25J 15/0616 |
| 11,597,475 | B2 * | 3/2023 | Price | B63B 17/00 |
| 11,958,573 | B2 * | 4/2024 | Rodehorst | B63B 34/26 |
| 2024/0318773 | A1 * | 9/2024 | Price | F16M 11/12 |

* cited by examiner

*Primary Examiner* — Guang H Guan

(74) *Attorney, Agent, or Firm* — Shook, Hardy & Bacon L.L.P.

(57) ABSTRACT

A device mount is configured to hold an electronic device. The device mount is configured to facilitate translation and rotation of a held electronic device. The device mount includes a mount post, a mount segment, and at least one attachment collar. The mount segment is configured to secure an electronic device thereto. Embodiments of the device mount include a mount post, one or more attachment collars, and one or more mount segments. The attachment collars may be fastened, or otherwise affixed, to a vehicle. The mount segments may include gimbal assemblies that facilitate dynamically adjustable positioning of an electronic mount.

16 Claims, 9 Drawing Sheets

DEVICE MOUNT

FIELD OF THE INVENTION

The present disclosure generally relates to mounts for electronic devices. More specifically, the present disclosure generally relates to mounts for electronic devices on a vehicle, such as a watercraft.

BACKGROUND

Various independent electronic devices are commonly utilized on, or in conjunction with, vehicles. For example, a boater may add an electronic fish finder, depth finder, or any number of other independent electronic devices to a boat to assist the boater in locating fish relative to the boat, avoid submerged obstacles, or any other relevant activity. These independent electronic devices may not be integrated with the vehicle during the manufacture of the vehicle. As such, a user, such as the vehicle operator, may desire to mount such a device at a location of the vehicle that is relevant to the devices use. However, existing mounts generally provide only a fixed position or a limited range of motion.

SUMMARY

Embodiments of the present disclosure relate to an electronic device mount. The electronic device mount is configured to attach (e.g., temporarily or permanently) one or more electronic devices to a vehicle (e.g., a boat, an all-terrain vehicle, off-road vehicles, a utility task vehicle, or any similar vehicle). The electronic device mount can be mechanically affixed to the vehicle at any suitable location such as a console, dash, or side wall of the vehicle.

For example, a first embodiment described herein is directed to a device mount configured to hold an electronic device. The device mount comprises a mount post having a first end and a second end; at least two attachment collars, each attachment collar slidably securable to an outer surface of the mount post; a first mount segment having an outer collar slidably securable to the outer surface of the mount post and configured to secure a first electronic device thereto; and a second mount segment slidably securable to the outer surface of the mount post and configured to secure a second electronic device thereto. Some embodiments of the mount segment are slidably positioned between a first of two (or more) attachment posts and the first end, and the second mount segment is slidably positioned between a second of the two (or more) attachment posts and the second end mount. The mount segments may include a gimbal component that facilitates rotation of a mounted electronic device in one or more axes. Some embodiments of the attachment collar include a compression lock that, when in an engaged position, secures the mount post's relative position with the attachment collar. The compression lock may engage via rotation of a threaded element of the compression lock.

A second embodiment described herein is directed to a mounting system. The mounting system may comprise at least one attachment collar, each attachment collar having a pair of armatures with a passage extending there through and there between; a mount post slidably passing through the passage, wherein the mount post is longitudinally and fixedly securable via a compression element of each attachment collar; and at least one mount segment, each mount segment configured to secure the electronic device thereto and having another passage there through, wherein each mount segment is slidably engaged with the mount post via the other passage and fixedly securable along the mount post via another compression element. Each mount segment can include a gimbal component having a rotation post that extends from the mount segment and is perpendicular to the mount post. In an embodiment, the gimbal component includes a rotation plate fixed to a mount collar of the first mount segment, the rotation plate can include the rotation post, a gasket, a locking plate, and a gasket retention component. The rotation post may extend from a first surface of the rotation plate opposite a second surface that is adjacent to the mount collar of the first mount segment and an inner surface of the bushing at least partially surrounds a portion of an outer surface of the rotation post.

A third embodiment described herein is directed to a mount at least one attachment collar, each attachment collar having a pair of armatures with a passage extending there through and there between; a mount post slidably passing through the passage, wherein the mount post is longitudinally and fixedly securable via a compression element of each attachment collar; and at least one mount segment, each mount segment configured to secure the electronic device thereto and having another passage there through, wherein each mount segment is slidably engaged with the mount post via the other passage and fixedly securable along the mount post via another compression element. Each mount segment can include a gimbal component having a base plate, locking plate, bushing, and rotation column. The rotation column can extend through the locking plate and the bushing and fixedly engage with the base pate.

Advantages of these and other embodiments will become more apparent to those skilled in the art from the following description of example embodiments which have been shown and described by way of illustration. As will be realized, the present embodiments described herein may be capable of other and different implementations, and their details are capable of modification in various respects. Accordingly, the drawings and description are to be regarded as illustrative in nature and not as restrictive.

BRIEF DESCRIPTION OF THE DRAWINGS

The present articles, devices, and systems for an electronic device mount are described in detail below with reference to the attached drawing figures, wherein.

DETAILED DESCRIPTION

Articles, devices, systems, and methods are disclosed related to various implementations of an electronic device mount. The electronic device mount is configured to attach (e.g., temporarily or permanently) one or more electronic devices to a vehicle (e.g., a boat, an all-terrain vehicle, off-road vehicles, a utility task vehicle, or any similar vehicle). Although the present disclosure may be described with reference to a non-autonomous aquatic vehicle, this is not intended to be limiting. For example, the articles, devices, systems, and methods described herein may be used in conjunction with, without limitation, non-autonomous vehicles, semi-autonomous vehicles, piloted and un-piloted robots or robotic platforms, warehouse vehicles, off-road vehicles, vehicles coupled to one or more trailers, flying vessels, boats, shuttles, emergency response vehicles, motorcycles, aircraft, construction vehicles, underwater craft, and/or other vehicle types. The vehicle may include components such as a frame, a vehicle body (e.g., a hull, deck, or similar), and other components of a vehicle. The vehicle may include a propulsion system, such as an internal combustion engine, hybrid electric power plant, an all-electric engine, and/or another propulsion system type. The propulsion system may be integrated with the vehicle (e.g., inboard), affixed (e.g., outboard), or a combination of both. Some vehicle propulsion system may be connected to a drive train of the vehicle, which may include a transmission, to enable the propulsion of the vehicle. The propulsion system may be controlled in response to receiving signals from the throttle/accelerator.

Generally, the embodiments described herein are configured to facilitate the adaptable and fixable position of one or more electronic devices. The device mount may be positioned and mechanically attached to a vehicle in a location that is convenient for the vehicle user and the utility provided by the electronic device. For example, in some situations it may be desirable for an electronic display coupled to a transducer-based fish finder or depth gauge to be observable by a boater/user while operating the helm controls of the boat. However, in other situations it may be desirable for the electric displays to be securely stored in another position or it may be desirable for the position or orientation of the electric displays to be adjusted. Accordingly, some embodiments of the device mount described herein facilitate translation of an electronic device along a mount post and rotation of the electronic device about one or more axes. Additionally, the embodiments of the device mount facilitate securably fixing the position and orientation of the electronic devices mounted thereto.

Figure 1:
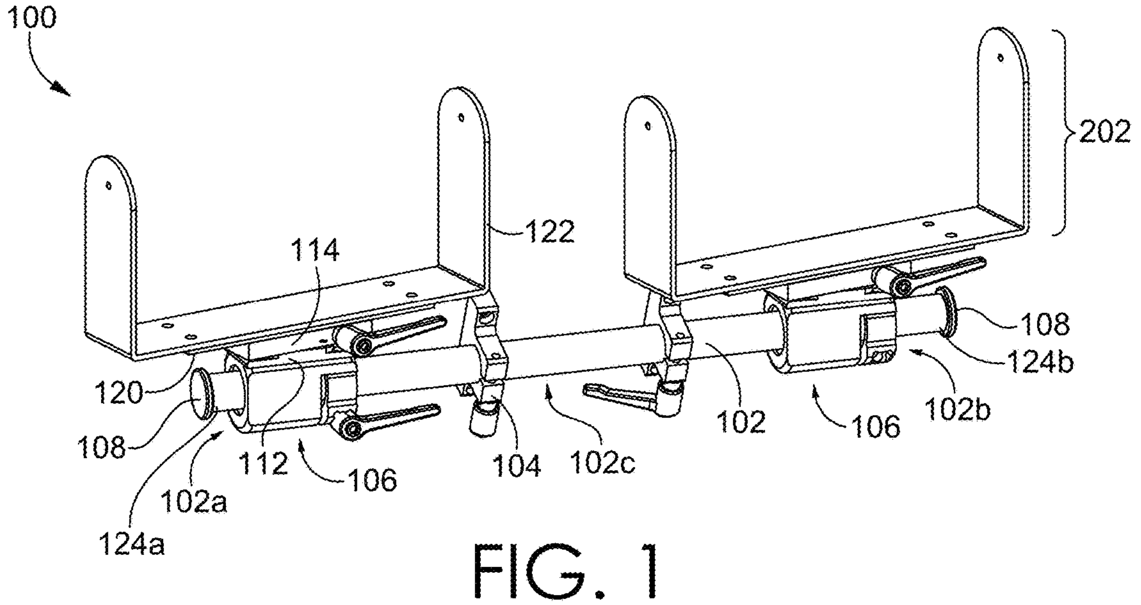
FIG. 1 is a perspective illustration of an example electronic device mount, in accordance with some embodiments of the present disclosure.

With reference to FIG. 1, FIG. 1 depicts an example electronic device mount 100, in accordance with some embodiments of the present disclosure. It should be understood that this and other arrangements described herein are set forth only as examples. Other arrangements and elements may be used in addition to or instead of those shown, and some elements may be omitted altogether. As can be best seen in FIGS. 1-3, 11, and 12, the electronic device mount 100 includes a mount post 102, one or more attachment collars 104, and one or more mount segments 106. Mount post 102 may comprise a metal or metal alloy. For example, in a particular embodiment mount post 102 comprises aluminum or stainless steel. Mount post 102 may be forged, milled, cast, extruded, manufactured by additive processes (e.g., printed), or produced by another suitable technique. In general, mount post 102 is attached to the vehicle (e.g., at an operator console, on the deck, on the hull, or any other desired location) via the one or more attachment collars (e.g., attachment collar 104, 1500, or 1600).

Figure 7:
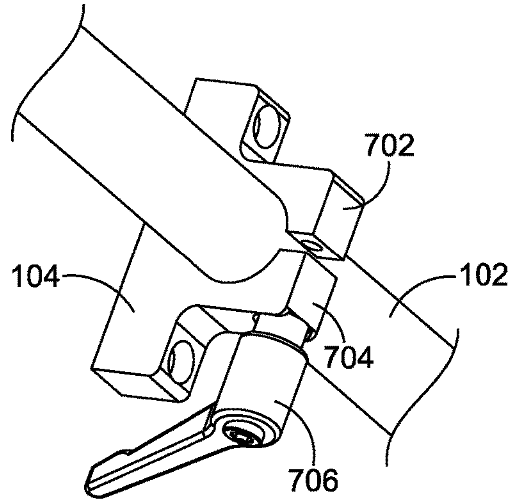
FIG. 7 is a perspective illustration of an attachment collar and mount post, in accordance with some embodiments of the present disclosure.

In some aspects, attachment collar 104 may comprise a metal or metal alloy. For example, in a particular embodiment, attachment collar 104 comprises aluminum or stainless steel. Attachment collar 104 may be forged, milled, cast, manufactured by additive processes (e.g., printed). Attachment collar 104 is configured to be affixed to a surface of a vehicle. For example, as depicted in FIG. 7, attachment collar 104 can include one or more channels that pass there through. The channels can be configured to allow a fixing element (e.g., a screw, bolt, or any similar element) to extend through while remaining seated within the channel. The channels are perpendicular to the mount post 102 in some aspects. Additionally, the attachment collar 104 includes at least a pair of armature portions 702 and 704. The pair of armature portions includes a passage extending there through and there between. The passage is configured to allow the mount post 102 to slide laterally there through. The attachment collar 104 may also include a fastener 706. The fastener 706 passes through the pair of armature portions 702 and 704. The fastener 706 facilitates fixing, at least temporarily, the lateral positioning of mount post 102. In some embodiments, the fastener 706 includes a threaded element that when rotated pulls each of the armature portions together, creating a compressive force on mount post 102. For example, a fastener 706 passes through the pair of armature portions and applies a clamping force that keeps the attachment collar 104 secure relative to the mount post 102. The fastener 706 includes a head, a shank, and a threaded segment. The head presents a flattened cylinder shape configured to be grasped and turned by the fingers of the user. The head may present an angular indicator representative of a current angular position of the head. In some embodiments, the angular position is indicative of whether the attachment collar 104 is in a locked configuration (e.g., engaged) or an unlocked configuration (e.g., disengaged). The shank extends from the head and is configured to fit within a fastener recess. The threaded segment extends from the shank and is configured to fit within a fastener receptor.

Figure 15A:
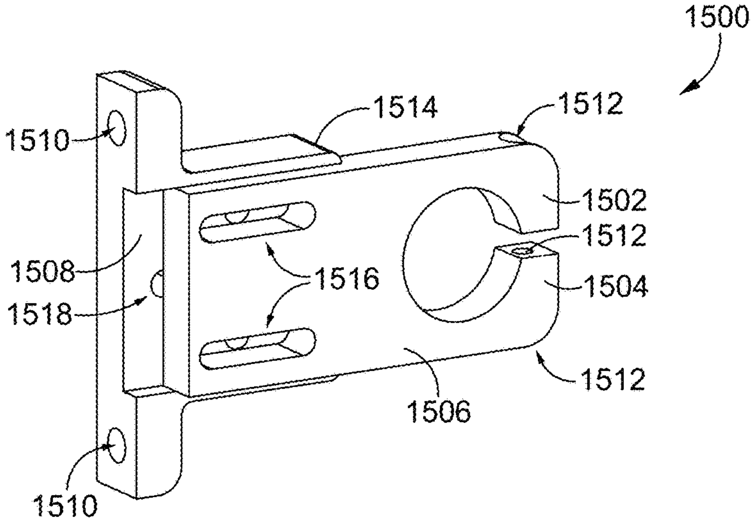
FIGS. 15A-15C are depictions of an example attachment collar assembly from various perspectives, in accordance with some embodiments of the present disclosure.
Figure 15B:
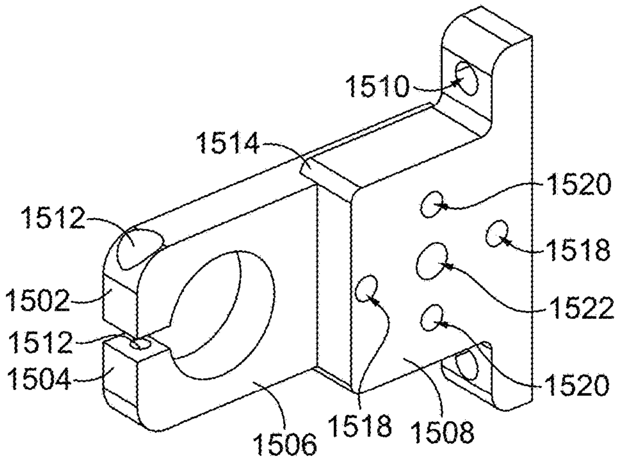
Figure 15C:
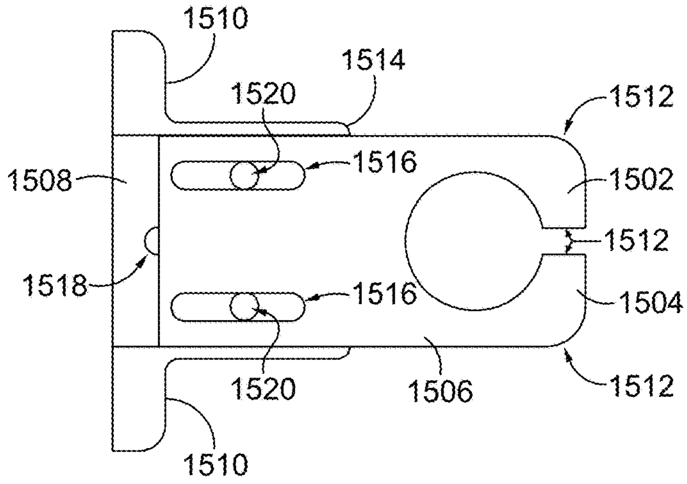

In some aspects, the attachment collar facilitates positional adjustment of the electronic device mount. For example, as depicted in FIGS. 15A, 15B, and 15C an attachment collar assembly 1500 may include an extension portion 1506 and a footing portion 1508. The footing portion 1508 includes one or more channels 1510 that pass there through. The channels 1510 can be configured to allow a fixing element (e.g., a screw, bolt, or any similar element) to extend through while remaining seated within one of the channels 1510. The channels 1510 are perpendicular to the mount post 102 in some aspects. Additionally, the extension portion 1506 includes one or more ridges 1514 and a plurality of anchor ports (e.g., anchor ports 1518, anchor ports 1520, and anchor port 1522). The one or more ridges 1514 are configured to provide mechanical support to resist rotational movement of the extension portion 1506. Accordingly, they extend from a first surface of the footing portion 1508 and form a "U" channel in which the extension portion 1506 can slide.

Additionally, the extension portion 1506 of attachment collar 1500 includes at least a pair of armature portions 1502 and 1504. The pair of armature portions includes a passage extending there through and there between. The passage is configured to allow the mount post 102 to slide laterally there through. The extension portion 1506 may also include a plurality of fastener receiving bores 1512 and a fastener (not depicted in FIG. 15A, 15B, or 15C). The fastener receiving bores 1512 pass through the pair of armature portions 1502 and 1504 in a complementary fashion. The fastener receiving bores 1512 facilitates fixing, at least temporarily, the position of mount post 102 as described in relation to attachment collar 104.

The extension portion 1506 also includes channels 1516 that extend internally along the length of the extension portion. The passaged formed by channels 1516 are positioned to align with anchor ports 1520 of the footing portion 1508. A fastener (not depicted) passes through channel 1516 to allow for fixing, at least temporarily, the relative position of extension portion 1506 within the "U" channel formed by ridges 1514 of the footing 1508.

Figure 16A:
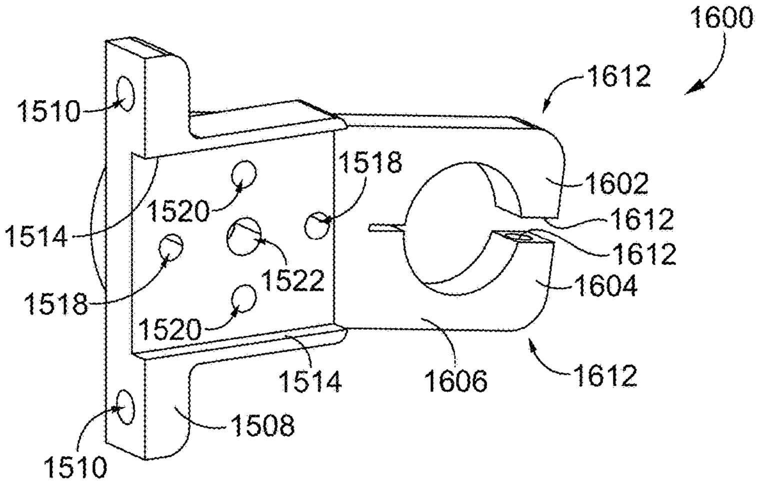
FIGS. 16A-16C are depictions of another example attachment collar assembly from various perspectives, in accordance with some embodiments of the present disclosure.
Figure 16B:
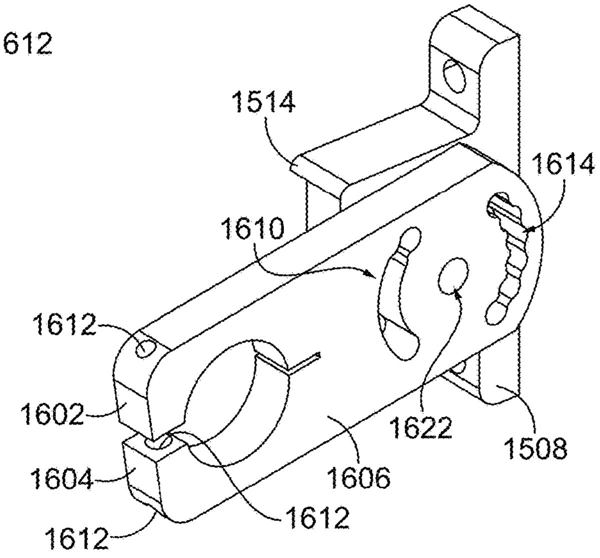
Figure 16C:
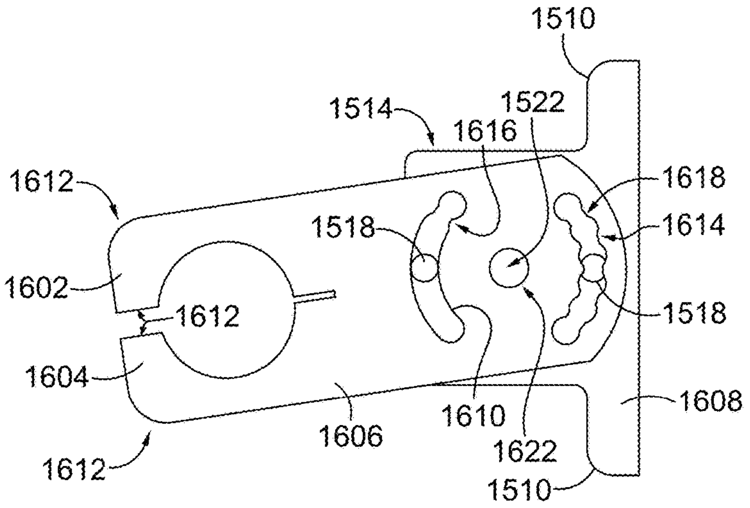

Alternatively, as depicted in FIGS. 16A, 16B, and 16C, an attachment collar may be configured to allow for repositioning of the mount post along an arch path defined by a channel. For example, attachment collar assembly 1600 may include rotation portion 1616 and a footing portion 1508. Rotation portion 1616 includes a pivot bore 1622 that is positioned to align with anchor port 1522. Rotation portion 1616 also includes pivot channels 1610 and 1614. The pivot channels 1610 and 1614 are radially centered about anchor port 1522. The pivot channels 1610 and 1614 are spaced to align with anchor ports 1518 or anchor ports 1520 depending on the rotational orientation of the rotation portion 1616 relative to footing portion 1508. The pivot channels may have a smooth inner surface or, as depicted, include one or more nodes that extend from the inner surface into the passaged formed by pivot channels (e.g., nodes 1614 and node 1616). The one or more nodes may facilitate fixing the relative rotational orientation of the rotation portion 1616 and footing portion 1508 at one or more predefined points.

Similar to the extension portion 1506 of FIGS. 15A, 15B, and 15C, the rotation portion 1616 includes a plurality of fastener receiving bores 1612 and a fastener (not depicted in FIG. 16A, 16B, or 16C). The fastener receiving bores 1612 pass through the pair of armature portions 1602 and 1604. The fastener receiving bores 1612 facilitates fixing, at least temporarily, the lateral positioning of mount post 102.

Returning to FIG. 1 and with particular focus on vehicle mount post 102 and the attachment collars 104, the vehicle mount post 102 may comprise three portions. For example, a first portion of mount post 102 can be defined as the portion 102*a* of mount post 102 that extends laterally from a first terminal end 124*a* of the mount post 102 to a first attachment collar 104. A second portion of mount post 102 can be defined as the portion 102*b* of mount post 102 that extends laterally from a second attachment collar to the second terminal end 124*b* of mount post 102. A third portion of the mount post 102 can be defined as the portion 102*c* of mount post 102 that extends laterally between the first attachment collar and the second attachment collar. When affixed to a vehicle, the length of the third portion 102*c* is static. In other words, attaching the attachment collars 104 to the vehicle fixes the length of the third portion 102*c*. However, the mount post 102 can laterally slide through the attachment collars 104. Accordingly, the length of first portion 102*a* and the length of second portion 102*b* are variable while the compression element (e.g., fastener 706 of FIG. 7) of the attachment collar 104 is disengaged and substantially static while the compression element of the attachment collar 104 is engaged.

Generally, mount segment 106 facilitates flexible and dynamic positioning of an electronic device. The electronic device may be secured to a device mount 122 of the mount segment 106. The device mount 122 may take any suitable form. For example, as depicted, device mount 122 may be a 'C' bracket with a pair of armatures configured to secure the electronic device there between. However, device mount 122 may take any other suitable form for an electronic device. The device mount 122 may also be configured to allow the electronic device to tilt about an axis. As depicted, the electronic device mount 100 includes mount segment 106, each mount segment 106 is configured to be slidably fixable along mount post 102. For example, the mount segment 106 may slide laterally along mount post 102 along the first portion 102*a* of mount post 102 or the second portion 102*b* of mount post 102.

Figure 4:
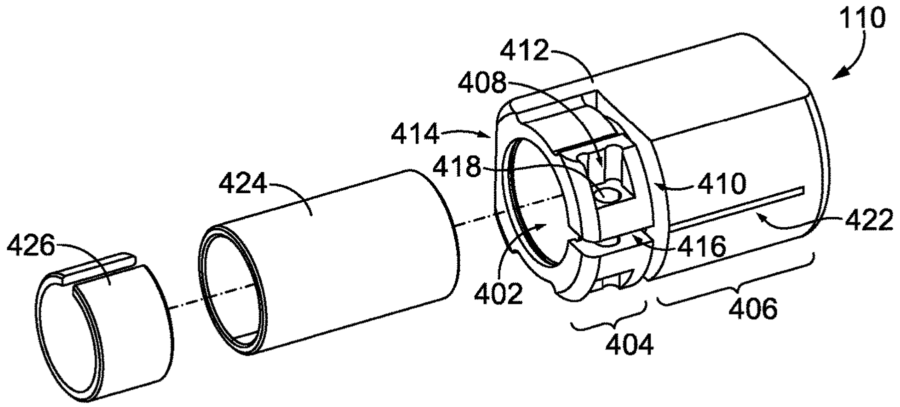
FIG. 4 is an illustration of an example device mount, in accordance with some embodiments of the present disclosure.
Figure 11:
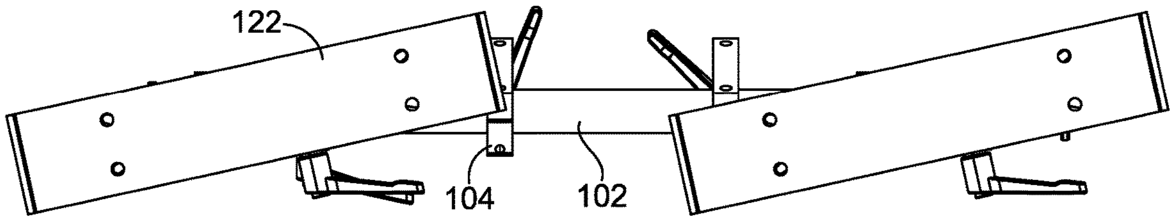
FIG. 11 is an overhead perspective illustration of an electronic device mount, in accordance with some embodiments of the present disclosure.
Figure 12:
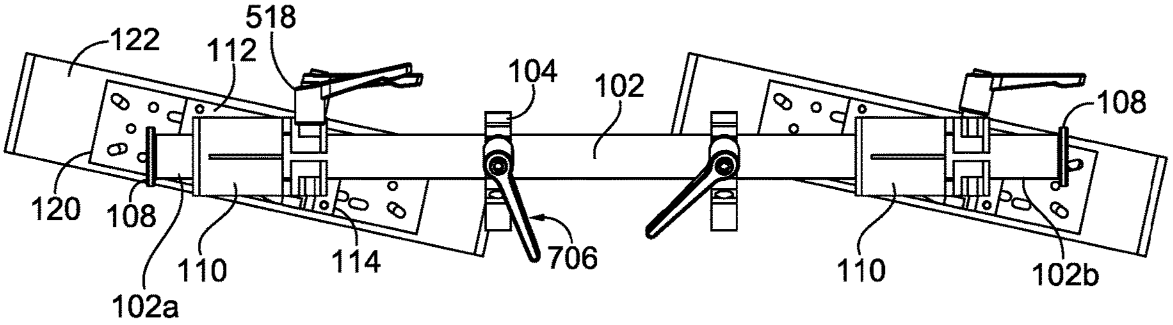
FIG. 12 is an underneath perspective illustration of an electronic device mount, in accordance with some embodiments of the present disclosure.

For example, with passing reference to FIGS. 4 and 11, the mount segment 106 includes a mount collar 110. Mount collar 110 may comprise a metal or metal alloy. For example, in a particular embodiment, mount collar 110 comprises aluminum or stainless steel. Mount collar 110 may be forged, milled, cast, extruded, manufactured by additive processes (e.g., printed), or produced by another suitable technique. As depicted in FIG. 4, mount collar 110 may be generally annular in shape with a void passage 402 that passes longitudinally through the mount collar 110. The inner annular surface of mount collar 110 is sized such that the mount post 102 may pass through void passage 420. The outer surface of mount collar 110 includes at least one substantially flat mounting surface 414. Preferably, the outer surface of mount collar 110 also includes two substantially flat surfaces perpendicular to mounting surface 414 and a general arc segment shape opposite the mounting surface 414. The preferred substantially flat surfaces facilitate the rotation of a head of fastener 420.

Additionally, mount collar 110 includes a compression portion 404 and a support portion 406. The compression portion 404 and support portion 406 may be formed from a common material and remain substantially connected via a portion 412 of the mounting surface 414. However, a void space 410 may partially separate compression portion 404 and a support portion 406. Compression portion 404 may include a pair of annularly shaped armatures that are separated by void space 416 opposite the mounting surface 414 that is parallel with the longitudinal axis of the mount collar 110. Each armature of the compression portion 404 include a fastener recess 408 and a fastener receptor 418. The fastener receptors 418 are perpendicular to the longitudinal axis of mount collar 110 and cooperatively aligned such that a fastener 420 (not depicted in FIG. 4) can pass there through. The fastener 420 may be a bolt and nut type fastener. For example, the fastener 420 of mount collar 110 can be tightened into and/or through the respective fastener receptor(s) 418 to reduce the spacing between the armatures of the compression portion 404. The reduced spacing (e.g., reducing the size of void space 416) applies a clamping force which keeps the mount collar 110 secure relative to the mount post 102. The fastener 420 includes a head, a shank, and a threaded segment. The head presents a flattened cylinder shape configured to be grasped and turned by the fingers of the user. The head may present an angular indicator representative of a current angular position of the head. In some embodiments, the angular position is indicative of whether the mount collar 110 is in a locked configuration (e.g., engaged) or an unlocked configuration (e.g., disengaged). The shank extends from the head and is configured to fit within the fastener recess 408. The threaded segment extends from the shank and is configured to fit within the fastener receptor 418.

Additionally, as depicted in FIG. 4, some embodiments of support portion 406 include a space 422 that extends from void space 410 partially along the length of the support portion 406 opposite the mounting surface 414 and aligned with void space 416. This void space 410 may facilitate flexion complementary to the clamping force while the fastener 420 is locked and may reduce friction between the mount post 102 and the mount collar 110 while the fastener 420 is unlocked. Additionally, the void space 416 can facilitate passive debris clearing (e.g., liquid drainage, dirt removal, or any similar clearance of incidental debris that may enter between the mount collar 110 and mount post 102).

Further, the vehicle mount may include one or more bushings that are positioned around the outer surface of mount post 102 and between mount post 102 and mount collar 110. For example, as depicted in FIG. 4, a support bushing 424 is configured to complement the size of support portion 406 and is configured to be positioned between mount post 102 and support portion 406 of mount collar 110. Some embodiments of the vehicle mount also include a second bushing 426 that is configured to complement the size of compression portion 404. The second bushing 426 includes a void space that complements the void 416 of compression portion 404. The void space of bushing 426 may facilitate the compressive force created when the mount post 102 is engaged without damaging bushing 426. Similar to support bushing 424, the bushing 426 may be configured to be positioned around the outer surface of mount post 102 and between mount post 102 and compression portion 404 of mount collar 110.

Figure 2:
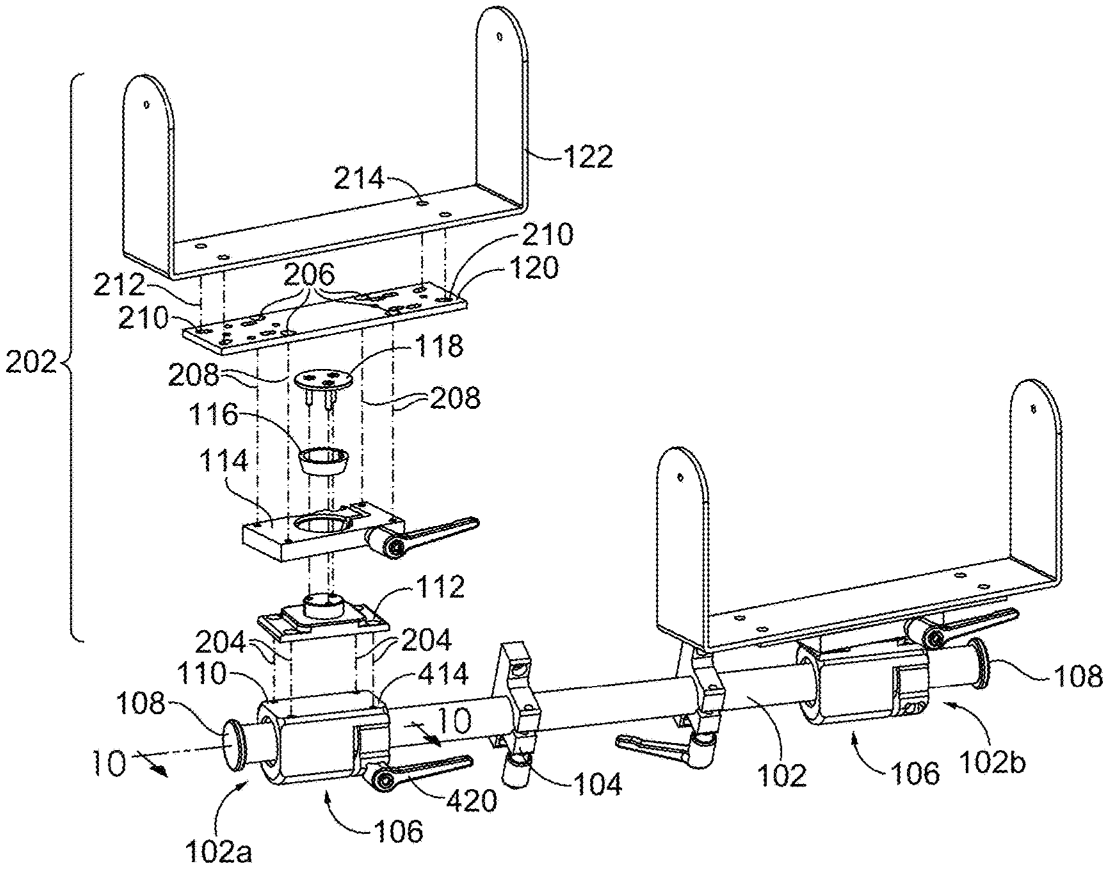
FIG. 2 is an exploded illustration of portions of the example electronic device mount, in accordance with some embodiments of the present disclosure.
Figure 3:
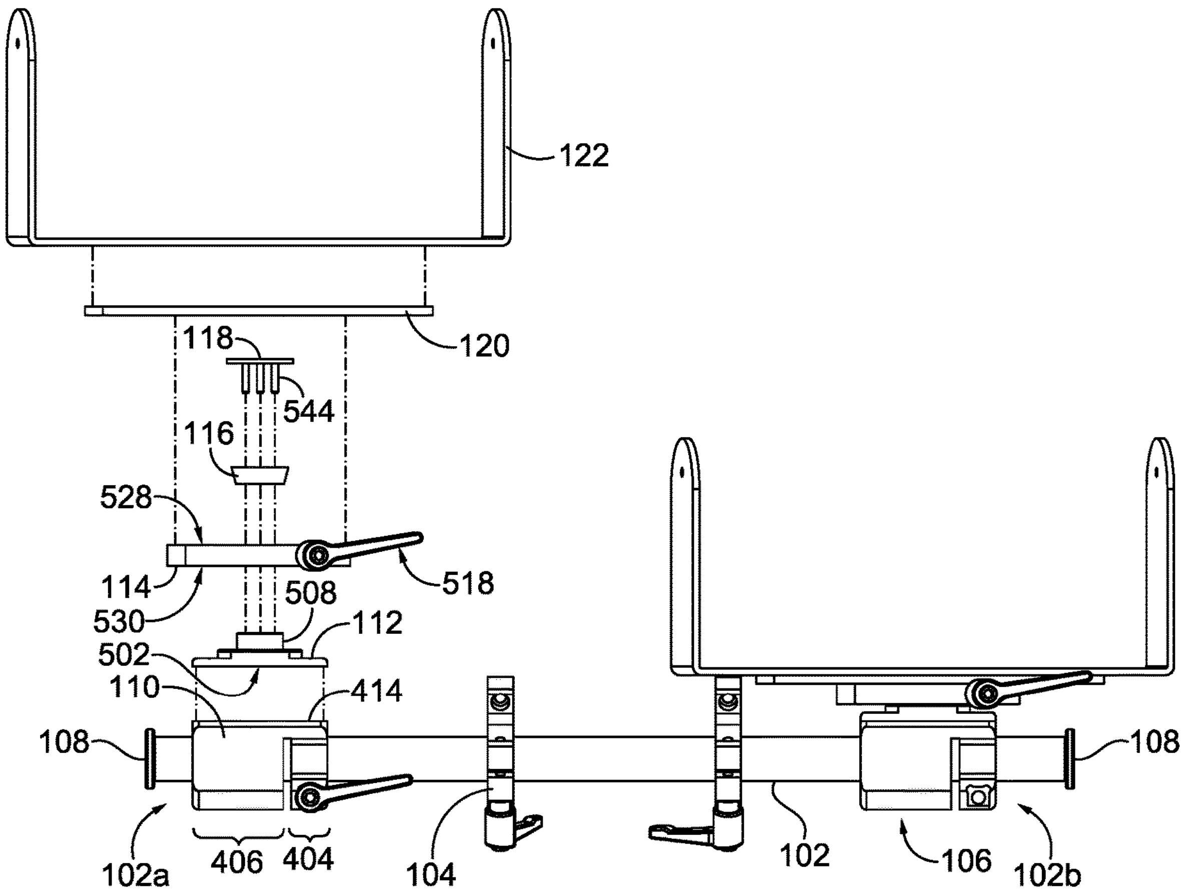
FIG. 3 is an exploded illustration of portions of the example electronic device mount, in accordance with some embodiments of the present disclosure.

Returning briefly to FIG. 1, the mount segment 106 also includes a gimbal assembly 202. Turning to FIGS. 2 and 3, an exploded view of some embodiments of mount segment 106 is provided. As depicted, the mount segment 106 includes a gimbal assembly 202. The gimbal assembly 202 may facilitate rotational positioning of a mounted electronic device along an axis perpendicular to the mount post 102. The gimbal assembly 202 includes a rotation plate 112, a locking plate 114, a bushing 116, a bushing retention component 118, an adaptor plate 120, and device mount 122. The gimbal assembly is attached via a plurality of fasteners to the mounting surface 414 of mount collar 110. For example, a plurality of fasteners may affix a rotation plate 112 to the mounting surface 414 along the attachment lines 204.

Figure 5:
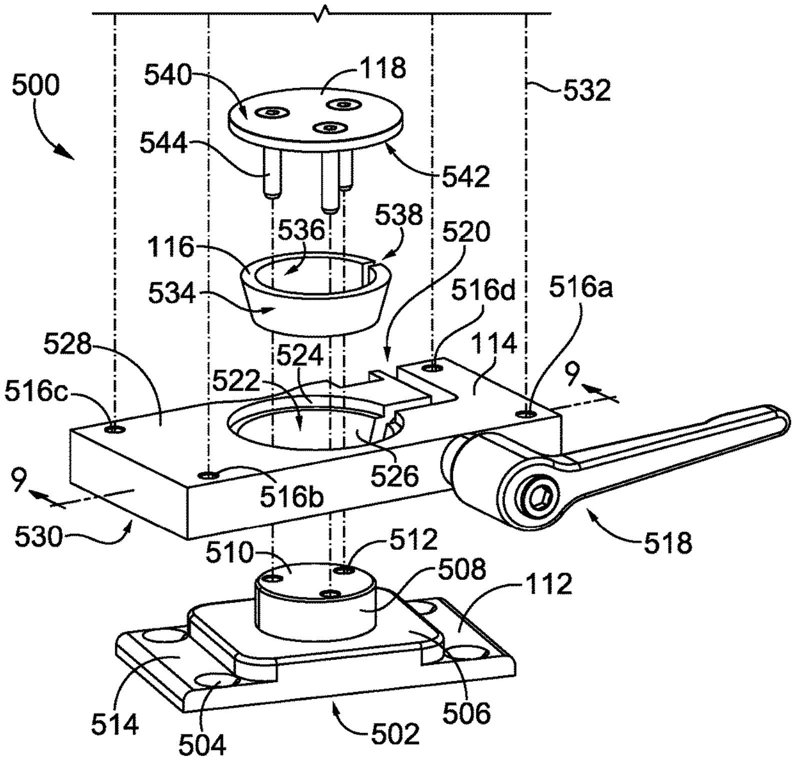
FIG. 5 is an exploded illustration of a portion of an example gimbal mount, in accordance with some embodiments of the present disclosure.

A selected portion of a gimbal assembly 500 is depicted in an exploded perspective in FIG. 5. The selected portion of a gimbal assembly 500 includes rotation plate 112, locking plate 114, bushing 116, and bushing retention component 118. Rotation plate 112 may comprise a metal or metal alloy. For example, in a particular embodiment, rotation plate 112 comprises aluminum or stainless steel. Rotation plate 112 may be forged, milled, cast, extruded, manufactured by additive processes (e.g., printed), or produced by another suitable technique. Rotation plate 112 is configured to facilitate rotation of the mounted electronic device around an axis perpendicularly, or substantially perpendicularly, to the longitudinal axis of the mount post 102. As shown in FIGS. 2 and 5, rotation plate 112 includes a planar surface 502 that abuts the mounting surface 414 of mount collar 110. Opposite the planar surface 502, rotation plate 112 includes a plurality of stepwise planar levels comprising a rotation plane 506, retention plane 510, and fastener plane 514. The fastener plane 514 facilitates attachment of rotation plate 112 to mount collar 110. For example, the rotation plate 112 can be affixed to mount collar 110 via a plurality of fasteners that pass through a corresponding plurality of fastener receptors 504 that pass through fastener plane 514. In an embodiment, fastener receptors 504 are countersunk (e.g., recessed) into the surface of fastener plane 514 to facilitate the substantially flush surface of fastener plane 514 when the fasteners are engaged. Said differently, fastener receptors 504 are configured such that the exposed end of the plurality of fasteners are substantially aligned with the fastener plane 514. The rotation plane 506 is partially recessed and extends from fastener plane 514. In some aspects, the edges of the rotation plane 506 includes a bevel. A cylindrical column extends from the rotation plane 506 to form rotation column 508. Rotation column 508 is substantially centered on the rotation plane 506. The rotation column 508 terminates at the retention plane 510. In some aspects, the transition between the sides of the rotation column 508 and retention plane 510 includes a bevel. The retention plane 510 includes a plurality of fasteners receiving bores 512. The fastener receiving bores 512 may include threading that complements the threading of fasteners of a bushing retention plate 118.

Locking plate 114 may comprise a metal or metal alloy. For example, in a particular embodiment, locking plate 114 comprises aluminum or stainless steel. Locking plate 114 may be forged, milled, cast, extruded, manufactured by additive processes (e.g., printed), or produced by another suitable technique. Locking plate 114 is configured to selectively secure a relative rotational position of the gimbal assembly 202 (and accordingly the relative rotational position of the mounted electronic device) about an axis perpendicularly, or substantially perpendicularly, to the mount post 102. The locking plate 114 includes a first planar surface 530 that abuts the rotation plane 506 of rotation plate 112. Locking plate 114 also includes a second planar surface 528 that is opposite the first planar surface 530. As depicted best in FIGS. 5, 8, and 9, the locking plate 114 includes, amongst other things, fastener receiving bores 516*a-d* (collectively 516), a fastener 518, channel 520, and a passage 522 that passes there through. Fastener receiving bores 516 are configured to engage with a plurality of fasteners that fix the adaptor plate 120 to (and abutting with) locking plate 114 along the attachment lines 532. The fastener receiving bores 516 may include threading that complements said fasteners.

Figure 8:
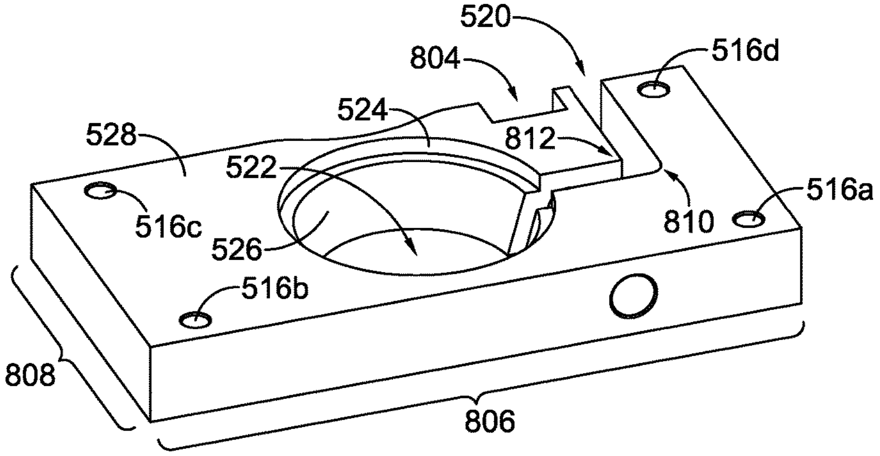
FIG. 8 is an overhead perspective illustration of a locking plate, in accordance with some embodiments of the present disclosure.
Figure 9:
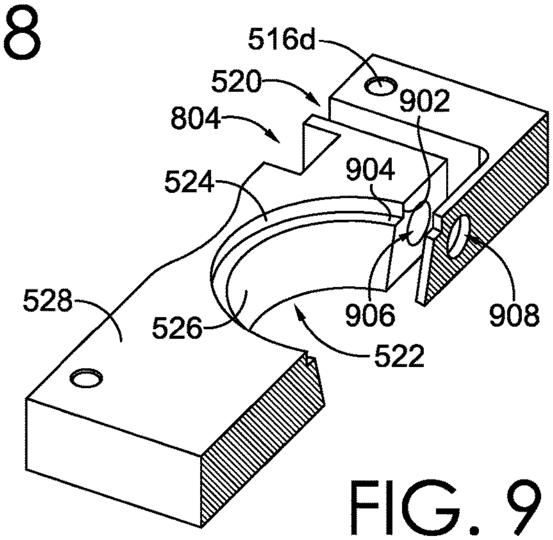
FIG. 9 is a cross-sectional illustration of a locking plate along line 5-5, in accordance with some embodiments of the present disclosure.

Channel 520, at least partially, facilitates a clamping force while the fastener 518 is locked and reduces friction between the locking plate 114 and the rotation plate 112 while the fastener 518 is unlocked. Additionally, the channel 520 can facilitate passive debris clearing (e.g., liquid drainage, dirt removal, or any similar clearance of incidental). Channel 520 is a passage that is perpendicular to, and extends through, the first planar surface 530 and the second planar surface 528 of locking plate 114. As best seen in FIG. 8, the channel 520 forms a passage separating the material proximate fastener receiving bore 516*d* from fastener receptor 804. Channel 520 thus forms a gap in the material of locking plate 114 between fastener receiving bore 516*d* and fastener receptor 804. Channel 520 extends perpendicularly, or substantially perpendicularly, to the length 806 of the locking plate 114 proximate the fastener receptor 804 and fastener receiving bore 516*d*. The channel 520 extends linearly to the mid-point, or the approximate mid-point, of the width 808 of locking plate 114. The channel 520 includes outer edge 810 and inner edge 812. At the mid-point, or the approximate mid-point, of the width 808 of locking plate 114, the outer edge 810 of channel 520 includes an arc-shaped curvature toward the passage 522. In some embodiments, the outer edge 810 may be a ninety-degree angle toward passage 522. At the mid-point, or the approximate mid-point, of the width 808 of locking plate 114, the inner edge 812 includes a ninety-degree angle turn toward passage 522. Channel 520 continues linearly to merge with passage 522. Accordingly, channel 520 extends perpendicularly from the outer edge of the locking plate 114 proximate and between fastener receiving bore 516*d* and fastener receptor 804. The path of channel 520 extension continues linearly to a point corresponding to the mid-point of the width 808 of locking plate 114. The path of channel 520 continues to extend parallel, or substantially parallel, with the outer edge of locking plate 114 until it merges with passage 522. Alternatively, channel 520 may form a similar passage separating the material proximate fastener receiving bore 516*a* from fastener receptor 814.

Passage 552 extends from the first planar surface 530 through locking plate 114 to the second planar surface 528. Passage 552 is formed from a void in the material of locking plate 114 that is defined by a cylindrical portion 524 and a tapered cylindrical portion 526. The cylindrical portion 524 extends from the surface 528 toward the surface 530 to a depth such that the top surface 540 of the bushing retention plate 118 is flush with, or slightly recessed from, surface 528 when bushing retention plate 118 is fixed to rotation plate 112, as depicted most clearly in FIGS. 5 and 6. As depicted along the line 9-9 in FIG. 9 and FIG. 8, cylindrical portion 524 terminates to form an upper ring 902 and seating ridge 904 that is configured to abut the bottom surface 542. Seating ridge 904 transitions to tapered cylindrical portion 526. Tapered cylindrical portion 526 is a truncated cone in shape with the widest portion occurring where the tapered cylindrical portion 526 merges with seating ridge 904. The portion 526 narrows passage 522 as it extends from seating ridge 904 toward surface 530. The portion 526 may narrow passage 522 at an angle complementary to the outer surface 534 of bushing 116.

Fastener 518 passes through the locking plate via void spaces 906 and 908. For example, the fastener 518 of the locking plate 114 can be tightened into and/or through the respective fastener receptor(s) 804 to reduce the spacing between the opposing sides of channel 520. The reduced spacing applies a clamping force which keeps the locking plate 114 secure relative to the rotation plate 112. The fastener 518 includes a head, a shank, and a threaded segment. For example, the fastener 518 may be a bolt and nut type fastener in some aspects. The head presents a flattened cylinder shape configured to be grasped and turned by the fingers of the user. The head may present an angular indicator representative of a current angular position of the head. In some embodiments, the angular position is indicative of whether the locking plate 114 is in a locked configuration (e.g., engaged) or an unlocked configuration (e.g., disengaged). The shank extends from the head and is configured to fit within the fastener receptor 804 via the void spaces 906 and 908.

Bushing 116 is generally configured to be positioned between rotation column 508 and tapered cylindrical portion 526. Said another way, the outer surface 534 of bushing 116 may be angled complementary to the truncated conical shape of tapered cylindrical portion 526. The inner surface 536 of bushing 116 may be similarly profiled as outer surface 534 in some embodiments. Alternatively, the inner surface 536 may be complementary to the rotation column 508. Additionally, bushing 116 includes a slot 538 that extends through the inner surface 536 and outer surface 534. The slot 538 is located such that it aligns with, or substantially aligns with, the channel 520. Some aspects of bushing 116 comprise an inert, or substantially inert, material. For example, bushing 116 may comprise ethylene propylene, silicone, rubber, a polymer of tetrafluoroethylene, polyoxymethylene, graphite, fiber glass, ceramic, or an elastomeric polymer. Using an inert, or substantially inert, material may reduce the potential for cross reactivity between the bushing 116 and locking plate 114 or rotation plate 112.

Figure 6:
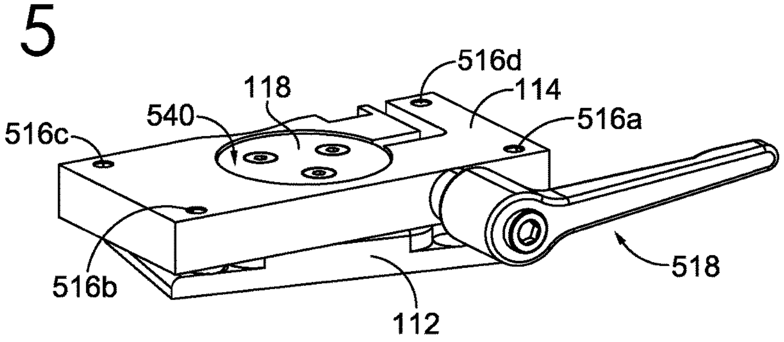
FIG. 6 is an illustration of a portion of an example gimbal mount, in accordance with some embodiments of the present disclosure.

The gimbal assembly includes a retention component configured to hold the bushing 116 in position between rotation column 508 and tapered cylindrical portion 526. As depicted in FIGS. 5 and 6, the retention component may comprise a bushing retention plate 118 that includes a plurality of fasteners (e.g., fastener 544). The top surface 540 of the bushing retention plate 118 is flush with, or slightly recessed from, surface 528 when bushing retention plate 118 is fixed to rotation plate 112, as depicted most clearly in FIGS. 5 and 6. The plurality of fasteners are positioned within the bushing retention plate 118 to align with, and be engageable with, the plurality of receiving bores 512. A portion of the bottom surface 542 abuts the seating ridge 904 while the plurality of fasteners are engaged with the plurality of receiving bores 512. Accordingly, the retention component (e.g., bushing retention plate 118) is configured to facilitate retention of the bushing 116 and retention of locking plate 114 while allowing for the fixable rotation of locking plate 114 about the rotation column 508.

Some embodiments of the gimbal assembly also include adaptor plate 120. Adaptor plate 120 is generally configured to securely affix the device mount 122 with locking plate 114. Accordingly, the size and shape of adaptor plate 120 may vary based on the size and shape of the device mount 122. Adaptor plate 120 may comprise a metal or metal alloy. For example, in a particular embodiment, adaptor plate 120 comprises aluminum or stainless steel. Adaptor plate 120 may be forged, milled, cast, extruded, manufactured by additive processes (e.g., printed), or produced by another suitable technique. Adaptor plate 120 comprises a plurality of fastener receptor(s), including at least a first set of fastener receptors 206 located complementary to fastener receiving bores 516 of the locking plate 114, and a second set of fastener receptors 210 located complementary to fastener receptors 214 of device mount 122. Some embodiments of adaptor plate 120 are affixed to locking plate 114 via a plurality of fasteners along affixing lines 208. Additionally, some embodiments of the adaptor plate 120 are affixed to device mount 122 via a plurality of fasteners along affixing lines 212.

Figure 13:
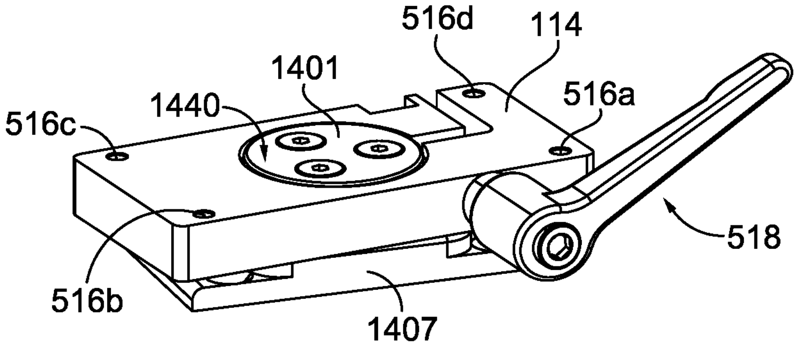
FIG. 13 is a perspective illustration of a portion of another example gimbal mount, in accordance with some embodiments of the present disclosure.
Figure 14:
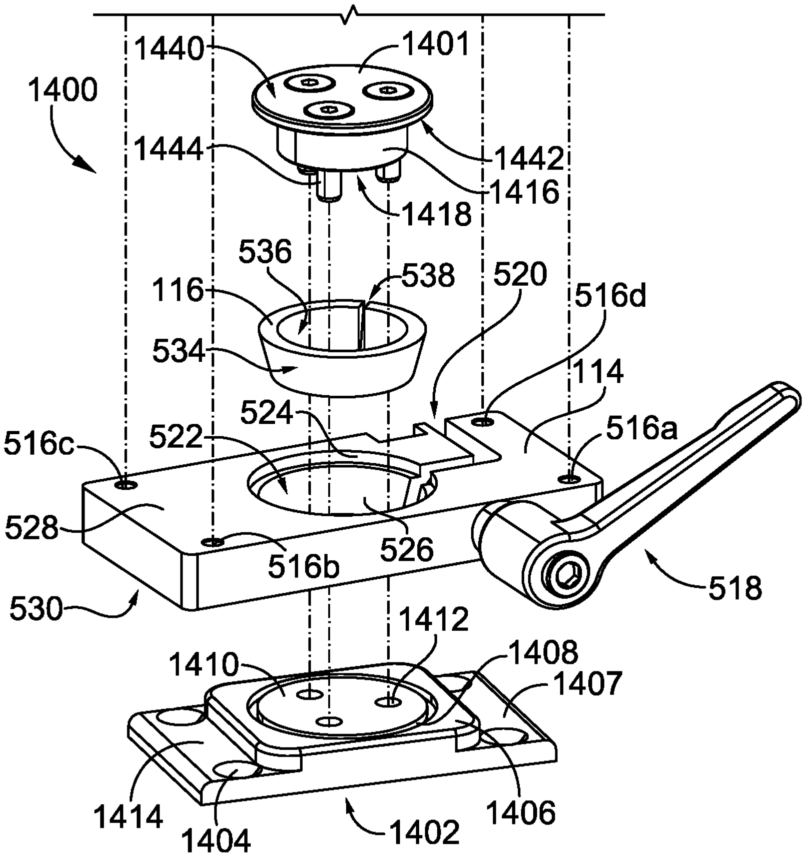
FIG. 14 is an exploded illustration of the portion of the other example gimbal mount, in accordance with some embodiments of the present disclosure.

An alternative selected portion 1400 of a gimbal assembly (e.g., gimbal assembly 202) is depicted in an exploded perspective in FIG. 14 and in perspective in FIG. 13. The selected portion 1400 of the gimbal assembly includes base plate 1407, locking plate 144, bushing 116, and rotation column 1401. Base plate 1407 may comprise a metal or metal alloy. For example, in a particular embodiment, base plate 1407 comprises aluminum or stainless steel. Base plate 1407 may be forged, milled, cast, extruded, manufactured by additive processes (e.g., printed), or produced by another suitable technique. Base plate 1407 is configured to cooperatively with rotation column 1401 to facilitate rotation of the mounted electronic device around an axis perpendicularly, or substantially perpendicularly, to the longitudinal axis of the mount post 102. As depicted in FIG. 14, base plate 1407 includes a planar surface 1402 that abuts the mounting surface 414 of mount collar 110. Opposite the planar surface 1402, base plate 1402 includes at least two planar levels comprising a rotation plane 1406 and fastener plane 1414. The fastener plane 1414 facilitates attachment of base plate 1407 to mount collar 110. For example, the base plate 1402 can be affixed to mount collar 110 via a plurality of fasteners that pass through a corresponding plurality of fastener receptors 1404 that pass through fastener plane 1414. In an embodiment, fastener receptors 1404 are countersunk (e.g., recessed) into the surface of fastener plane 1414 to facilitate the substantially flush surface of fastener plane 1414 when the fasteners are engaged. Said differently, fastener receptors 1404 are configured such that the exposed end of the plurality of fasteners are substantially aligned with the fastener plane 1414. The rotation plane 1406 is partially recessed and extends from fastener plane 1414. In some aspects, the edges of the rotation plane 1406 includes a bevel. A cylindrical ring extends into the rotation plane 1406 to form rotation channel 1408. Rotation channel 1408 is substantially centered on the rotation plane 1406. The depression of rotation channel 1408 creates an inner circular portion 1410 of the rotation plane 1406. The inner circular portion 1410 includes a plurality of fasteners receiving bores 1412. The fastener receiving bores 1412 may include threading that complements the threading of fasteners 1444 of a rotation column, such as rotation column 1401.

As described above in reference to FIG. 5, locking plate 114 is configured to selectively secure a relative rotational position of the gimbal assembly 202 (and accordingly the relative rotational position of the mounted electronic device) about an axis perpendicularly, or substantially perpendicularly, to the mount post 102. The locking plate 114 includes a first planar surface 530 that abuts the rotation plane 506 of rotation plate 112. Locking plate 114 also includes a second planar surface 528 that is opposite the first planar surface 530. As depicted best in FIGS. 14, 8, and 9, the locking plate 114 includes, amongst other things, fastener receiving bores 516*a-d* (collectively 516), a fastener 518, channel 520, and a passage 522 that passes there through. Fastener receiving bores 516 are configured to engage with a plurality of fasteners that fix the adaptor plate 120 to (and abutting with) locking plate 114 along the attachment lines 532. The fastener receiving bores 516 may include threading that complements said fasteners.

Bushing 116 is generally configured to be positioned between rotation column 508 and tapered cylindrical portion 526. Said another way, the outer surface 534 of bushing 116 may be angled complementary to the truncated conical shape of tapered cylindrical portion 526. The inner surface 536 of bushing 116 may be similarly profiled as outer surface 534 in some embodiments. Alternatively, the inner surface 536 may be complementary to the rotation column 508. Additionally, bushing 116 includes a slot 538 that extends through the inner surface 536 and outer surface 534. The slot 538 is located such that it aligns with, or substantially aligns with, the channel 520. Some aspects of bushing 116 comprise an inert, or substantially inert, material. For example, bushing 116 may comprise ethylene propylene, silicone, rubber, a polymer of tetrafluoroethylene, polyoxymethylene, graphite, fiber glass, ceramic, or an elastomeric polymer. Using an inert, or substantially inert, material may reduce the potential for cross reactivity between the bushing 116 and locking plate 114 or rotation column 1401.

The alternative selected portion 1400 of gimbal assembly also includes a retention component configured to hold the bushing 116 in position. Specifically, as depicted in FIGS. 14 and 15, the retention component may comprise a rotation column 1401 that includes a plurality of fasteners (e.g., fastener 1444). The top surface 1440 of the rotation column 1401 is flush with, or slightly recessed from, surface 528 when rotation column 1401 is fixed to base plate 1407, as depicted most clearly in FIGS. 14 and 15. The plurality of fasteners are positioned within the rotation column 1401 to align with, and be engageable with, the plurality of receiving bores 1412. A portion of the bottom surface 1442 abuts the seating ridge 904 while the plurality of fasteners are engaged with the plurality of receiving bores 1412. The rotation column 1401 includes the top surface 1440, bottom surface 1442, and rotation shaft 1416. Rotation shaft 1416 extends as a cylinder from bottom surface 1442 away from top surface 1440. The rotation shaft 1416 is centered within rotation column 1401 and is configured to pass through bushing 116 and locking plate 114. The diameter of rotation shaft 1416 may be of any suitable size. Preferably, the diameter of rotation shaft 1416 complements the inner diameter of bushing 116. Further, the bottom surface 1418 of rotation shaft 1416 abuts the rotation plane 1406 of base plate 1402. Accordingly, the retention component (e.g., rotation column 1401) is configured to facilitate retention of the bushing 116 and retention of locking plate 114 while allowing for the fixable rotation of locking plate 114 about the rotation shaft 1416.

Figure 10:
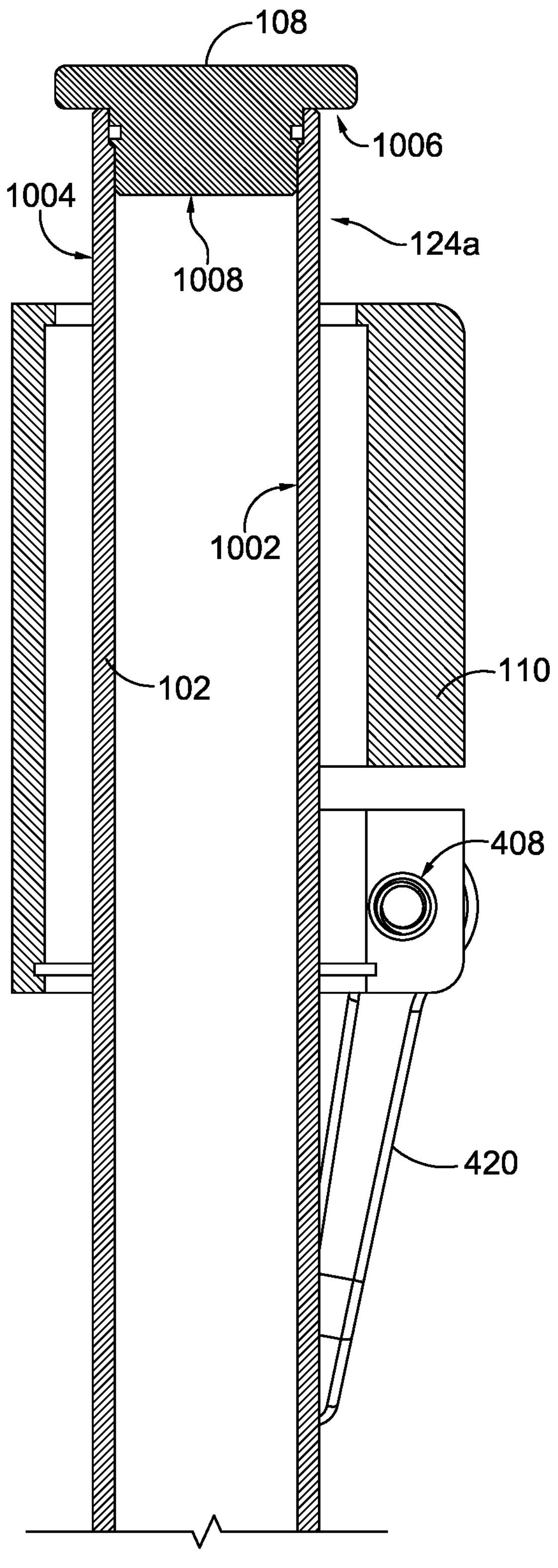
FIG. 10 is a cross-sectional view illustration of a portion of the electronic device mount along line 10-10 of FIG. 3, in accordance with some embodiments of the present disclosure.

Returning to FIG. 1, the terminal ends 124*a* and 124*b* of mount post 102 terminate with an end cap 108, in some embodiments. As best seen in FIG. 10, the end cap 108 may extend beyond the other surface of mount post 102. For example, in an aspect, the end cap 108 includes a portion 1006 that extends past the outer surface 1004 of mount post 102. The end cap 108 also includes a portion 1008 that engages with the inner surface 1002 of the terminal end 124*a* of mount post 102. In some embodiments, portion 1008 and the inner surface 1002 of the terminal end 124*a* may include complementary threading such that securable engagement may be facilitated.

In this description, references to "one embodiment," "an embodiment," or "embodiments" means that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claim(s) set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in the paragraph shall apply unless so stated in this description and/or except as will be readily apparent to those skilled in the art from the description.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

What is claimed is:

1. A mount configured to hold an electronic device, the mount comprising:

a mount post having a first end and a second end;

at least two attachment collars, each attachment collar slidably securable to an outer surface of the mount post;

a first mount segment having an outer collar slidably securable to the outer surface of the mount post, the first mount segment having a device mount comprising a C-bracket with a pair of armatures configured to secure a first electronic device therebetween, and the first mount segment configured to secure the first electronic device thereto via the device mount of the first mount segment; and a second mount segment slidably securable to the outer surface of the mount post, the second mount segment having a device mount comprising a C-bracket with a pair of armatures configured to secure a second electronic device therebetween, and the second mount segment configured to secure the second electronic device thereto via the device mount of the second mount segment;

wherein the first mount segment includes a gimbal component having a rotation post;

wherein the gimbal component comprises:

a rotation plate fixed to the outer collar of the first mount segment, the rotation plate including the rotation post;

a bushing;

a locking plate; and a bushing retention component.

2. The mount of claim 1, wherein the first mount segment is slidably positioned between a first attachment collar of the at least two attachment collars and the first end, and wherein the second mount segment is slidably positioned between a second attachment collar of the at least two attachment collars and the second end.

3. The mount of claim 1, wherein each attachment collar includes a compression lock that in an engaged position secures a position of the mount post relative to the attachment collar.

4. The mount of claim 3, wherein each of the compression locks is engaged by rotation of a threaded element of the compression lock.

5. The mount of claim 1, wherein the rotation post extends from the first mount segment and is perpendicular to the mount post.

6. The mount of claim 1, wherein the rotation post extends from a first surface of the rotation plate, the first surface of the rotation plate being opposite a second surface that is adjacent to the outer collar of the first mount segment.

7. The mount of claim 1, wherein an inner surface of the bushing at least partially surrounds a portion of an outer surface of the rotation post.

8. The mount of claim 7, wherein an outer surface of the bushing is at least partially surrounded by at least a portion of an inner surface of the locking plate.

9. The mount of claim 8, wherein the locking plate includes a compression element that in an engaged state compresses the bushing against the outer surface of the rotation post.

10. The mount of claim 1, wherein the bushing comprises ethylene propylene, silicone, rubber, a polymer of tetrafluoroethylene, graphite, fiber glass, ceramic, or an elastomeric polymer.

11. The mount of claim 1, wherein the bushing retention component has a plurality of pins mechanically engaged within a top surface of the rotation post and a retention plate at least partially over a top surface of the bushing.

12. The mount of claim 1, wherein the first end terminates with an end cap threadably engaged with an inner surface of the mount post.

13. A mounting system comprising:

at least one attachment collar, each attachment collar having a pair of armatures with a passage extending therethrough and therebetween;

a mount post slidably passing through the passage, wherein the mount post is longitudinally fixedly securable via a compression element of each attachment collar; and at least one mount segment, each mount segment having a device mount comprising a C-bracket with a pair of armatures configured to secure an electronic device therebetween, each mount segment configured to secure the electronic device thereto via the device mount of the mount segment, each mount segment having another passage therethrough, wherein each mount segment is slidably engaged with the mount post via the another passage of the mount segment and fixedly securable along the mount post via another compression element;

wherein each mount segment includes a gimbal component having a rotation post that extends from the mount segment and is perpendicular to the mount post;

wherein the gimbal component includes:

a rotation plate fixed to a mount collar that abuts an outer surface of the mount post, the rotation plate including the rotation post;

a bushing;

a locking plate; and a bushing retention component.

14. The mounting system of claim 13, wherein the rotation post extends from a first surface of the rotation plate, the first surface of the rotation plate being opposite a second surface that is adjacent to the mount collar; and wherein an inner surface of the bushing at least partially surrounds a portion of an outer surface of the rotation post.

15. The mounting system of claim 14, wherein the locking plate includes a fastener that in an engaged state compresses the bushing against the outer surface of the rotation post.

16. The mounting system of claim 14, wherein the locking plate includes a channel that extends through a first planar surface and a second planar surface of the locking plate and between a fastener receiving bore and a fastener receptor.

* * * * *